United States Patent [19]

Schoenberg

[11] Patent Number: 4,489,185

[45] Date of Patent: Dec. 18, 1984

[54] CARBINOL-CONTAINING POLYIMIDES CAPABLE OF SELF-CROSSLINKING AT LOW TEMPERATURE

[76] Inventor: Jules E. Schoenberg, 2079 Lyde Pl., Scotch Plains, N.J. 07076

[21] Appl. No.: 536,114

[22] Filed: Sep. 26, 1983

Related U.S. Application Data

[63] Continuation-in-part of Ser. No. 401,496, Jul. 26, 1982, abandoned, which is a continuation-in-part of Ser. No. 351,801, Feb. 24, 1982, abandoned.

[51] Int. Cl.$^3$ .............................................. C08G 73/10
[52] U.S. Cl. ..................................... 524/104; 524/600; 525/426; 528/26; 528/172; 528/188; 528/189; 528/229; 528/352; 528/353; 548/433; 548/473; 548/476; 548/479
[58] Field of Search ................ 525/426; 528/188, 189, 528/352, 353, 229, 172, 26; 524/104, 600; 548/433, 473, 476, 479

[56] References Cited

U.S. PATENT DOCUMENTS

| | | | |
|---|---|---|---|
| 3,609,123 | 9/1971 | Rabilloud et al. | 528/353 |
| 3,793,291 | 2/1974 | Cohen et al. | 528/353 |
| 3,933,745 | 1/1976 | Bargain et al. | 528/353 |
| 3,939,109 | 2/1976 | Barie, Jr. et al. | 528/229 |

FOREIGN PATENT DOCUMENTS 0077718  4/1983  European Pat. Off. .

*Primary Examiner*—Lester L. Lee

[57] ABSTRACT

Novel carbinol-containing polyimides capable of self-crosslinking at low temperatures are prepared by reacting a molar excess of selected 3,3',4,4'-benzhydrol tetracarboxylic acid compounds (the tetraacid, diester-diacid, or (dianhydride) with polyfunctional polyamines (e.g. 4,4'-methylenedianiline, 1,6-hexanediamine, etc.) in an inert organic solvent at about 100°–150° C. The molar ratio of tetracarboxylic acid compound to diamine must be between 2:1 and 9:8. The polyimides may be crosslinked at less than 200° C. via a reaction between the carbinol group(s) and the end group(s) of the polyimide.

20 Claims, No Drawings

CARBINOL-CONTAINING POLYIMIDES CAPABLE OF SELF-CROSSLINKING AT LOW TEMPERATURE

This application is a continuation-in-part of application Ser. No. 401,496 filed July 26, 1982, which is a continuation-in-part of application Ser. No. 351,801 filed Feb. 24, 1982, both now abandoned.

BACKGROUND OF INVENTION

This invention relates to selected carbinol-containing polyimides capable of self-crosslinking at low temperatures. It also relates to the process for their preparation and their use as adhesives to form crosslinked products.

Polyimides are synthetic organic resins characterized by repeating imide linkages in the polymer chain which may or may not be terminated with polymerizable or inert (i.e. non-polymerizable) chemical groups. They are available in both linear and crosslinked forms and are noted for their outstanding chemical and physical properties, particularly their high temperature oxidative stability and strength. In addition to their use as adhesives and molded articles, they may be used as precured films and fibers, curable enamels, and laminating resins.

Most polyimides, especially the preferred aromatic polyimides, are extremely difficult to process due to their insolubility and extremely high softening points. Attempts to improve their processability have included the introduction of aliphatic segments into the otherwise aromatic polymers and the introduction of flexibilizing moieties such as alkylene, ether, or thio bridges into the polymer chain.

The most common method of insuring processability is to apply the polymer in the form of the polyamic acid intermediate. However, during curing to the fully or partially imidized resin, an appreciable amount of a volatile by-product (e.g. water, alcohol, or mixtures thereof depending upon the starting tetracarboxylic acid compound) is formed. This leads to the formation of voids when the resin is used as an adhesive between non-porous substrates or for forming molded articles.

One method of overcoming these disadvantages is the use of low molecular weight polyimides end-capped with polymerizable groups such as unsaturated groups. These end-capped polyimides can be subsequently cured to void-free, higher molecular weight resins since no volatile by-product is formed. Polyimides end-capped with 3,6-endomethylene-1,2,3,6-tetrahydrophthalimide and 3-ethynylphenyl groups are respectively disclosed in U.S. Pat. No. 3,528,950 issued Sept. 15, 1970 to H. R. Lubowitz and U.S. Pat. No. 3,879,349 issued Apr. 22, 1975 to N. Billow et al. However, the polyimides terminated with these groups require high cure temperatures, i.e. within the range of about 200°–350° C., to effect further polymerization.

Another method involves the use of polyimide compositions having increased solubility in various organic solvents. Such polyimides are disclosed in European patent application No. 82401866.7 filed Oct. 11, 1982 and published under the No. 0 077 718 on Apr. 27, 1983. The polyimides are prepared by reacting an aromatic diamine with a tetraester or with a diester-diacid derived from benzhydrol-3,3',4,4'-tetracarboxylic acid. The reaction is continued until the resultant carbinol-containing polyimide has an intrinsic viscosity of 0.1–2 dl/g (measured at 30° C. and a concentration of 5 g./l in N-methylpyrrolidone). Preferably approximately equimolar amounts of the aromatic diamine and tetra-ester or diester-diacid are dissolved in an appropriate solvent. It is possible, however, to use an excess of either monomer (generally less than 50 mole % and preferably 0–20 mole %). The reaction mixture formed by the solvent and the reagents is then heated at a temperature of 80° C. or above, preferably 100°–150° C., until the composition reaches the desired viscosity. The degree of imidization is between 50 and 99.9%, with the remaining groups being amide-acid and/or amide-ester groups. For most applications fully imidized polymers with no oxidizable terminal functional groups, especially amine groups, are preferred. These polymers possess maximum resistance to heat and oxidation and release less volatile by-product during use.

The polyimide solutions of the above European patent application are stated to be useful in the preparation of adhesive films. They, however, suffer from the same disadvantage as the end-capped polyimides, i.e. they require high cure temperatures or the addition of a crosslinking agent such as epoxides, isocyanates, alkyl titanates, anhydrides and halides of carboxylic acids, and silicones. The curing temperature typically used was 1 hr. at 100° C., then 2 hours at 200° C., followed by removal of the film from the support and further heat treatment for 20 min. at 300° C. (see Example 3 of the European patent application). If the crosslinking agent is used, it is added in amounts up to 50%. Generally it is mixed with the polyimide solution before use and the crosslinking reaction occurs during the final heating at about 100°–200° C. (see Examples 18 and 19).

There is a need for polyimides with good adhesive properties which can be cured at a low temperature without the use of crosslinkable compounds. The use of high cure temperatures has a significant drawback - namely, the requirement that the substrate be exposed to temperatures of 200°–300° C. to crosslink the resin. Many semi-conductor devices cannot accept these temperatures, and this is an end use area where polyimides are extensively used because of their outstanding properties (i.e. low outgassing and ability to immobilize ions).

The present invention provides selected carbinol-containing polyimides that self-crosslink at low temperatures. It also provides a process for their preparation by the reaction of an excess of a 3,3',4,4'-benzhydroltetracarboxylic acid compound with a polyfunctional primary amine. It further provides adhesives, coatings and molded articles based on the low temperature crosslinkable or crosslinked polyimides.

SUMMARY OF THE INVENTION

Carbinol-containing polyimides curable at low temperatures are prepared by reacting a molar excess of a 3,3',4,4'-benzyhydroltetracarboxylic acid compound selected from the group consisting of the tetraacid, diester-diacid, and dianhydride with a polyfunctional aliphatic, cycloaliphatic, heterocyclic, or aromatic primary amine using a molar ratio of between 2:1 and 9:8. The reaction is carried out in an inert organic solvent at a temperature sufficient to effect polymerization and imidization. The polyimide herein comprises a chain of recurring units having the formula:

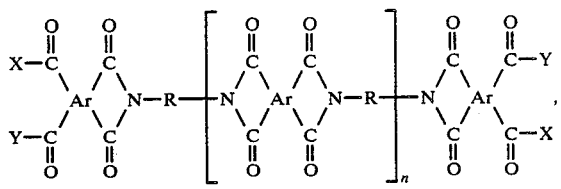

wherein R is a divalent aliphatic, cycloaliphatic, aromatic, or heterocyclic radical; Ar is the same or different aromatic radical with the two pairs of attached carbonyl groups situated on adjacent carbon atoms in the Ar radical, wherein at least one of the Ar groups has the formula

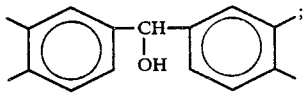

X and Y are —OH, or X is —OH when Y is —OR' or Y is —OH
when X is —OR', or X and Y together are an O group; R' is the same or a different lower alkyl group; and n is 0 to 7. They are noted for their particularly high solubility in numerous organic solvents and good adhesive properties.

It is believed the low temperature heat curing occurs via a self-crosslinking reaction between the carbinol group(s) and the end group(s) of the polyimide which may be diacid, acid-ester, or anhydride groups. Curing may be carried out at less than 200° C. for about 0.5 to 2 hours, typically for about 1 hour. Higher temperatures may be used to effect the cure but are unnecessary.

DESCRIPTION OF THE PREFERRED EMBODIMENTS

Typically the diester-diacids or tetraacids are used. The diester-diacids may be derived from the dianhydride by reaction with an alcohol, preferably a lower alcohol. The tetraacids are also derived from the dianhydride by the addition of water.

It is also possible to use a mixture of typical tetracarboxylic acid compounds (e.g. a 3,3',4,4'-benzophenonetetracarboxylic acid compound) and the 3,3',4,4'-benzhydroltetracarboxyl acid compound, provided that the carbinol-containing compound is present in the resulting polyimide in an amount sufficient to provide the carbinol groups needed for the self-crosslinking reaction. Likewise it may be possible to selectively introduce the carbinol-containing tetracarboxylic compound into the chain or into the terminal positions by forming an amine-terminated polyimide or polyamic intermediate and then reacting the amine-terminated intermediate with an excess of the carbinol-containing compound. Such variations are within the skill of the practitioner to effect.

Suitable polyfunctional amines include the aliphatic, cycloaliphatic, heterocyclic, and aromatic amines well-known in the art and listed in U.S. Pat. No. 3,528,950 (cited previously). Aromatic diamines containing flexibilizing moieties, e.g. 4,4'-methylenedianiline, 4,4'-oxydianiline, 4,4'-sulfonyldianiline, and 4,4'-bis(3-aminobenzoyl)diphenyl ether, are preferred. However, m-phenylenediamine, an aromatic diamine which contains no flexibilizing moieties, is also useful herein. Aliphatic diamines suitable for use herein include bis(3-aminopropyl)tetramethyl disiloxane and 1,6-hexanediamine.

One or more of the polyamines or diamines described hereinabove are reacted in a suitable inert organic solvent with the benzhydrol compound (or its admixture with other tetracarboxylic acid compounds). Reaction conditions used for the preparation of the polyimides herein will depend upon the diamine used. They will also depend upon the solvent selected and the concentration and molecular weight of the polyamic intermediate desired in the final solution to be imidized. The reactions are carried out under anhydrous conditions preferably using pure monomers and dry solvent.

The solvents used should dissolve at least one of the reactants, preferably both. Polar solvents are preferred. Suitable solvents include, for example, phenols, glycol ethers, amides, dimethylsulfoxide, dimethylsulfone, tetramethyl urea, dioxane, pyridine, quinoline, 1-methyl-2-pyrrolidinone, N-acetylpyrrolidinone, hexamethylphosphotriamide, tetramethylene sulfone, and the like. These solvents can be used alone or in combination with other solvents such as benzene, benzonitrile, dioxane, xylene, toluene, and cyclohexane. The preferred solvent is 1-methyl-2-pyrrolidinone.

The 3,3',4,4'-benzhydrol tetracarboxylic acid compound (or its admixture with another tetracarboxylic acid compound) must be present in a specific molar excess if low temperature curing is to be achieved. The molar ratio of tetracarboxylic acid compound to amine must be between about 2:1 and 9:8, preferably between 2:1 and 6:5. As will be shown hereafter, if a ratio outside this range is used, the polyimide requires higher temperatures to effect the cure. Likewise, the use of equimolar amounts or an excess of the diamine will result in polyimides which will not self-cure at low temperatures.

The molecular weight is controlled by the stoichiometry, as well as the reaction time and temperature, and the resulting n values range from 0-7, preferably 0-4.

On removal of the solvent, such as in a typical adhesive application, the polyimide crosslinks rapidly. Curing at temperatures of 100°-125° C. for about 1 hour effects partial crosslinking, as indicated by the partial insolubility of the resins in their former solvent (e.g. 1-methyl-2-pyrrolidinone). More complete crosslinking, as indicated by their complete insolubility in the solvent, is accomplished by curing for about 1 hour at about 150° C.

In one method, the 3,3',4,4'-benzhydroltetracarboxylic acid dianhydride is reacted with an anhydrous lower alcohol, preferably a lower alcohol such as methanol or ethanol, to fonm the corresponding diester-diacid, which is then hydrogenated at about 20°-30° C. and 50-600 psi until the rate of hydrogen uptake decreases sharply. Higher temperatures and pressures may lead to hydrogenolysis of the hydroxyl group. After removal of the catalyst, the amine and solvent (e.g. 1-methyl-2-pyrrolidinone) are then added and the excess alcohol distilled off, preferably under moderate vacuum. The polymerization begins at about 100° C. The by-products (i.e. alcohol and water) are distilled off, either by using a moderate vacuum and a temperature below the boiling point of the solvent or by adding a water-insoluble solvent, such as toluene, and collecting the water-alcohol mixture in a Dean-Stark water trap. For the latter technique to work well a water-soluble, lower alcohol, preferably methanol, should be formed as the by-product.

When the dianhydride is used as the starting material, it is preferable to maintain the anhydride in excess by adding the diamine, in portions, to a solution of the dianhydride in an anhydrous solvent. The initial polymerization to produce the polyamic acid intermediate occurs at a relatively low temperature. The subsequent ring closing reactions to the polyimide produce only water as a by-product.

When more than one tetracarboxylic acid compound is used to prepare the polyimides, they may be added together to form the random copolymer or they may be added and polymerized sequentially to form more ordered polymers such as block copolymers.

It is desirable to store the polyimides under dry conditions prior to use. The polyimides may be used as adhesives or moldings. They are usually used as smooth viscous solutions which can be applied to suitably prepared substrate surfaces; if desired, they may be formulated with fillers, thickeners, pigments, etc. They may be used with or without supports such as glass fabric. Alternatively, they may be cast into a film from solution and then applied. If necessary, the substrates are allowed to stand to permit some or all of the solvent to evaporate. The treated surfaces to be bonded are assembled together by means of a clamp or press and the assembled substrates are heated to effect crosslinking of the polyimide.

The resins may be converted to the dry form by precipitating with a suitable solvent, such as toluene, and used to form filled or unfilled molded articles. They are especially useful therein since the subsequent curing to effect crosslinking via the ring opening reaction does not form a volatile by-product and the molded articles are void-free. Compression molding temperatures and pressures can be determined by the skilled practitioner.

It can be appreciated that a large number of variations may be effected in the selection of polyfunctional amines and optional tetracarboxylic acid compounds, as well as in the preparation and use procedures herein, without materially departing from the scope and spirit of the invention. Such variations will be apparent to those skilled in the art and are to be included within the scope of this invention.

The following examples will more fully illustrate the embodiments herein. In the examples, all parts and percentages are given by weight and all temperatures are in degrees Celsius unless otherwise noted. Inherent viscosities were determined on 1 g./dl. solutions at 25° C. in 1-methyl-2-pyrrolidinone, also referred to as N-methylpyrrolidinone and abbreviated NMP.

EXAMPLE I

This example describes the preparation of the polyimide by the reaction of the bis(methyl half-ester) of 3,3',4,4'-benzhydroltetracarboxylic acid and 4,4'-methylenedianiline and its subsequent curing to the crosslinked product. It also describes the preparation of the half-ester.

PREPARATION OF BIS(METHYL HALF-ESTER) OF 3,3',4,4'-BENZYHYROLTETRACARBOXYLIC ACID.

A total of 241.7 g. (0.75 mole) of 3,3',4,4'-benzophenonetetracarboxylic dianhydride was refluxed with stirring for 2 hours with 400 ml. of methanol. The solution was cooled and charged to a 1 l. autoclave along with 100 ml. methanol, 10 g. of 5% palladium on activated carbon, and 5 drops of N,N-diethyl nicotinamide. Hydrogenation of the resulting bis(methyl half-ester) of 3,3',4,4'-benzhydroltetracarboxylic acid was carried out at 25°–30° C. and 100–150 psi until the rate of hydrogen uptake decreased sharply. The solution was gravity filtered, and the filter paper and its contents were washed with methanol. The yield was 584.6 g., which corresponded to 779.5 g. of solution per mole. The $C^{13}$ NMR spectrum indicated that hydrogenation of the ketone to carbinol was 90% complete and that there was no hydrogenolysis of the alcohol (i.e. no $CH_2$ formation).

PREPARATION OF THE POLYIMIDE (TETRACARBOXYLIC ACID HALF ESTER/DIAMINE MOLE RATIO - 4/3)

A 500 ml. round bottom, 4-neck flask was charged with 0.12 moles (93.5 g.) of the above solution containing the half-ester, 0.09 moles (17.8 g.) of 4,4'-methylenedianiline, and 85 ml. of NMP. The methanol was removed by vacuum distillation up to a pot temperature of 110° C. and a vacuum of 20 mm Hg. A total of 65 ml. of toluene was added and the flask was fitted with a 30 ml. Dean-Stark receiver. The solution was refluxed until the water-methanol mixture ceased to evolve (about 3–4 hours). The toluene was then removed by vacuum distillation.

The resulting polyimide had an inherent viscosity of 0.10. It was cast on a glass plate as a 0.002 in. film and cured for 1 hour at 150° C. The resulting polymer was insoluble in NMP, indicating that it was crosslinked. The film was tough and adhered strongly to the glass.

EXAMPLES II–XIII

Additional anhydride terminated polyimides and the crosslinked products thereof were prepared using the procedure of Example I and the bis(methyl half-ester) of 3,3',4,4'-benzhydrotetracarboxylic acid described therein. The diamine used, the tetracarboxylic acid half-ester/diamine mole ratio, number (n) of recurring units, and the inherent viscosity of the resulting polyimide are given below.

| Experiment No. | Diamine | Mole Ratio | n | Inherent Viscosity |
|---|---|---|---|---|
| II | 4,4'-oxydianiline | 4/3 | 2 | 0.22 |
| III | 4,4'-sulfonyldianiline | 4/3 | 2 | 0.17 |
| IV | 4,4'-bis(3-aminobenzoyl)-diphenyl ether | 4/3 | 2 | 0.14 |
| V | bis(3-aminopropyl)tetramethyl disiloxane | 4/3 | 2 | 0.37 |
| VI | m-phenylenediamine | 4/3 | 2 | 0.21 |
| VII | 1,6-hexanediamine | 4/3 | 2 | 0.19 |
| VIII | 1,3-bis(3-aminophenoxy)-benzene | 4/3 | 2 | 0.20 |
| IX | 4,4'-methylenedianiline | 2/1 | 0 | 0.17 |
| X | 4,4'-methylenedianiline | 5/4 | 3 | 0.18 |
| XI | 4,4'-methylenedianiline | 6/5 | 4 | 0.29 |
| XII | 4,4'-methylenedianiline | 9/8 | 7 | 0.21 |
| XIII (comparative) | 4,4'-methylenedianiline | 12/11 | 10 | 0.19 |

The resulting polyimides were cast as films, as described above. Films II–XII crosslinked after 1 hr. at 150° C. The polyimide prepared with a molar excess outside the indicated range (12/11) did not crosslink at a low temperature. It only crosslinked after 1 hr. at 250° C.

EXAMPLE XIV (COMPARATIVE)

This example demonstrates that a polyimide prepared according to the procedure of European patent application No. 82401866.7 will not self-crosslink at low temperatures.

Using the procedure of Example 3 of the above application a polyimide was prepared using a stoichiometric amount of the methyl half-ester of 3,3',4,4'-benzhydroltetracarboxylic acid and 4,4'-oxydianiline. A mixture of 38.83 g. (0.1 mole) of the diacid-diester, 20 g. of the diamine, and 59 g NMP was heated at 140° C. The solution remained clear during the entire heating period. The polymer formation was monitored by measuring the intrinsic viscosity after 4 hours and 11 hours. The values obtained were 0.257 and 0.357. The viscous amber solution had a polymer concentration of 49.7%. The polyimides were cast as films using the above procedure and heat-cured for 1 hr. at 150° C. The resulting films did not adhere strongly to the glass and dissolved in NMP indicating that the polymers were not crosslinked.

The above experiment was repeated and the polymerization was stopped after 3 hr. in order to obtain a polymer having a lower intrinsic viscosity. The resulting polyimide which had an intrinsic viscosity of 0.18 was cast as films and heat cured for 1 hr. at 150°, 200°, and 250° C., respectively. The polymer cured at 150° C. formed a film which was soluble in NMP. The films cured at 200° and 250° C. were insoluble indicating crosslinking had occurred.

EXAMPLE XV (COMPARATIVE)

This example demonstrates that a polyimide which was prepared with a molar excess of the diamine did not crosslink at low temperatures.

Using the procedure of Example I a polyimide was prepared using the bis(methyl half-ester) of 3,3',4,4'-benzhydroltetracarboxylic acid and 4,4'-oxydianiline. The molar ratio was 3:4 instead of 4:3 as in Example II. The resulting polyimide had an intrinsic viscosity of 0.14 in NMP. A film was cast and cured as in Example II (1 hr. at 150° C.). The polymer did not crosslink and no film formed. The material did not adhere to the glass and flaked off easily.

EXAMPLE XVI (COMPARATIVE)

This example demonstrates that the carbinol group must be present in the polyimide to provide the low temperature cure.

A polyimide was prepared as in Example I except that bis-(methyl half-ester) of 3,3',4,4'-benzophenone tetracarboxylic acid was used instead of the bis(methyl half-ester) of 3,3',4,4'-benzhydrol tetracarboxylic acid. The diamine used was 1,3-bis(3-aminophenoxy)benzene. The resulting polyimide had an intrinsic viscosity of 0.14. When cast as a film, it did not crosslink after 1 hr. at 150° C. nor did it crosslink after 1 hr. at 250° C.

EXAMPLE XVII

This example describes the polymerization of the tetraacid of 3,3',4,4'-benzhydroltetracarboxylic acid with 4,4'-oxydianiline.

A mixture of 241.7 g. (0.75 moles) of 3,3'-benzophenone tetracarboxylic dianhydride, 54 ml. (3.0 moles) of water, and 450 ml. of tetrahydrofuran was refluxed for 5 hr. During the hydrolysis reaction the mixture first became homogeneous and then a precipitate formed. The IR spectra showed an absence of anhydride groups.

The mixture was charged to a 1 l. autoclave together with 6 g. of 5% palladium on carbon which was wetted down with 6 g. water to suppress sparking. Hydrogenation was carried out at 95°–116° C. and 400–600 psi. $C^{13}$ NMR analysis showed the product to be a mixture of 85 mole % 3,3',4,4'-benzhydroltetracarboxylic acid and 15 mole % 4,4'-methylene bis(phthalic acid).

A total of 0.20 moles of the above mixture of tetracarboxylic compounds was polymerized with 0.15 moles of 4,4'-oxydianiline following the procedure of Example I. The resulting polyimide had an inherent viscosity of 0.21. A film was cast and cured for 1 hr. at 150° C. It was crosslinked and insoluble in NMP.

EXAMPLE XVIII

The following example illustrates the use of a mixture of the benzhydrol compound and a non-carbinol-containing tetracarboxylic acid compounds. The polymerization was carried out using the procedure of Example I except that 0.06 mole (19.3 g.) of 3,3',4,4'-benzophenonetetracarboxylic acid dianhydride was refluxed for 2 hr. with 40 ml. of methanol, the solution was cooled, and 0.06 mole (46.8 g.) of the bis(methyl half-ester) of 3,3',4,4'-benzhydroltetracarboxylic acid was added to give 0.12 mole of combined tetracarboxylic acid compounds. The diamine used, mole ratio of tetracarboxylic acid compounds to diamine, and inherent viscosity of the resulting polyimide is given below.

| Experiment No. | Diamine | Mole Ratio | Inherent Viscosity |
|---|---|---|---|
| XIV | 4,4'-methylenedianiline | 4/3 | 0.21 |

The resulting polyimide was cast as a film; it crosslinked after 1 hour at 150° C.

EXAMPLE XIX

The following example illustrates the use of the polymer of Example I as an adhesive.

Two steel bars having the dimensions 1.27 by 10.16 by 0.32 cm. were used as the test materials to be bonded. Prior to application of the adhesive, the surfaces were scoured with Scotchbrite (trade name for a scouring pad marketed by 3M Co.) and then cleaned with acetone. A small amount of the adhesive was spread along the cleaned surface of one bar near one edge. The second bar was pressed against the first bar to form an adhesive film such that there was 1.27 cm. overlap for each bar and hence a bonding area of 1.61 $cm.^2$. The bars were clamped together by means of a spring clip and cured for 1 hr. at 150° C. The tensile shear strength was determined by pulling the bars apart with an Instron Tensile Tester at a crosshead operation speed of 0.254 cm./min. The average of 5 samples was 78 kg./$cm.^2$ (1110 lb./$in.^2$).

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. A carbinol-containing polyimide curable at temperatures less than 200° C., which is prepared by reacting a molar excess of a 3,3',4,4'-benzhydrol tetracarboxylic acid compound selected from the group consisting of the tetraacid, diester-diacid, and dianhydride with a polyfunctional aliphatic, cycloaliphatic, heterocyclic, or aromatic primary amine using a molar ratio of between 2:1 and 9:8, the reaction being carried out in an inert organic solvent at a temperature sufficient to effect polymerization and imidization, the polyimide comprising a chain of recurring units having the formula:

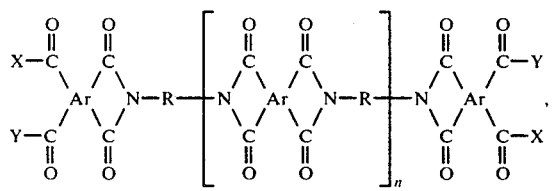

wherein R is a divalent aliphatic, cycloaliphatic, aromatic, or heterocyclic radical; Ar is the same or different aromatic radical with the two pairs of attached carbonyl groups situated on adjacent carbon atoms in the Ar radical, wherein at least a substantial number of the Ar groups have the formula

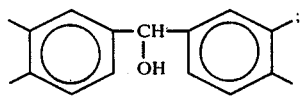

X and Y are —OH, or X is —OH when Y is —OR' or Y is —OH when X is —OR', or X and Y together are an O group; R' is the same or a different lower alkyl group; and n is 0 to 7.

2. The polyimide of claim 1, wherein the polyimide has an intrinsic viscosity of up to about 0.40 when determined on 1 g./dl. solutions at 25° C. in 1-methyl-2-pyrrolidinone.

3. The polyimide of claim 2, wherein the molar ratio is between 2:1 and 6:5 and n is 0–4 and wherein the curing temperature is 150° C. or less.

4. The polyimide of claim 3, wherein the intrinsic viscosity is about 0.10–0.40.

5. The polyimide of claim 1, wherein the amine is selected from the group consisting of 4,4'-methylenedianiline, 4,4'-oxydianiline, 4,4'-sulfonyldianiline, 4,4'-bis(3-aminobenzoyl)diphenyl ether, m-phenylenediamine, bis(3-aminopropyl)tetramethyl disiloxane, 1,6-hexanediamine, and 1,3-bis(3-aminophenoxy)benzene.

6. The polyimide of claim 5, wherein the polyimide has an intrinsic viscosity up to about 0.40 when determined on 1 g./dl. solutions at 25° C. in 1-methyl-2-pyrrolidinone.

7. The polyimide of claim 6, wherein the molar ratio is between 2:1 and 6:5 and n is 0–4.

8. The polyimide of claim 5, wherein the amine is 4,4'-oxydianiline or 4,4'-methylenedianiline.

9. The polyimide of claim 5, wherein a mixture of the bis(methyl half-ester) of 3,3',4,4'-benzhydroltetracarboxylic acid and the bis(methyl half-ester) of 3,3'4,4'-benzophenone tetracarboxylic acid is used.

10. The polyimide of claim 8, wherein the molar ratio is between 2:1 and 4:3 and n is 0–2.

11. The polyimide of claim 10, wherein the polyimide has an intrinsic viscosity of about 0.15–0.25 when determined on 1 g./dl. solutions at 25° C. in 1-methyl-2-pyrrolidinone.

12. The polyimide of claim 11, wherein the amine is 4,4'-oxydianiline and wherein the molar ratio is about 4:3 and n is 2.

13. The polyimide of claim 1, wherein the reaction is carried out at about 100°–150° C.

14. The polyimide of claim 13, wherein the solvent is a polar solvent.

15. The polyimide of claim 14, wherein the solvent is selected from the group consisting of phenols, glycol ethers, amides, dimethylsulfoxide, dimethyl sulfone, tetramethyl urea, dioxane, pyridine, quinoline, 1-methyl-2-pyrrolidinone, N-acetylpyrrolidinone, hexamethylphosphotriamide, and tetramethylenesulfone.

16. The polyimide of claim 15, wherein the solvent is 1-methyl-2-pyrrolidinone.

17. An organic solution containing a carbinol-containing polyimide, useful for preparing an adhesive film curable at less than 200° C., which is prepared by reacting a molar excess of a 3,3',4,4'-benzhydroltetracarboxylic acid compound selected from the groups consisting of the tetraacid, diester-diacid, or dianhydride with an aromatic or aliphatic diamine selected from the group consisting of 4,4'-methylenedianiline, 4,4'-oxydianiline, 4,4'-sulfonyldianiline, 4,4'-bis(3-aminobenzoyl)diphenyl ether, m-phenylenediamine, bis(3-aminopropyl)tetramethyl disiloxane, 1,6-hexanediamine, and 1,3-bis(3-aminophenoxy)benzene using a molar ratio of between 2:1 and 9:8, the reaction being carried out in a inert polar organic solvent at between about 100°–150° C.

18. The polyimide of claim 17, wherein the solvent is 1-methyl-2-pyrrolidinone and wherein the cure temperature is about 150° C.

19. A process for preparing a polyimide curable at temperatures less than 200° C., which comprises the steps of:
   a. reacting a 3,3',4,4'-benzhydroltetracarboxylic acid compound selected from the group consisting of the tetraacid, diester-diacid, or dianhydride with an aromatic or aliphatic diamine at about 100°–150° C. in an inert polar organic solvent using a molar ratio of tetracarboxylic acid compound to diamine of between 2:1 and 9:8; and
   b. removing the water and/or alcohol by-products.

20. The process of claim 19, further comprising the step of (c) removing the solvent.

* * * * *

UNITED STATES PATENT AND TRADEMARK OFFICE
CERTIFICATE OF CORRECTION

PATENT NO. : 4,489,185
DATED : December 18, 1984
INVENTOR(S) : Jules E. Schoenberg It is certified that error appears in the above-identified patent and that said Letters Patent are hereby corrected as shown below:

On the title page;

[73] Assignee: National Starch and Chemical Corporation, Bridgewater, New Jersey Signed and Sealed this Sixteenth Day of July 1985

[SEAL]

Attest:

DONALD J. QUIGG

Attesting Officer    Acting Commissioner of Patents and Trademarks

UNITED STATES PATENT AND TRADEMARK OFFICE
CERTIFICATE OF CORRECTION

PATENT NO. : 4,489,185

DATED : December 18, 1984

INVENTOR(S) : JULES E. SCHOENBERG

It is certified that error appears in the above-identified patent and that said Letters Patent are hereby corrected as shown below:

At Col. 7, lines 17, 27, 28, 43 and 58, rewrite "intrinsic" as --inherent--.

In Claim 2, at line 2, rewrite "intrinsic" as --inherent--.

In Claim 4, at line 1, rewrite "intrinsic" as --inherent--.

In Claim 6, at line 2, rewrite "intrinsic" as --inherent--.

In Claim 11, at line 2, rewrite "intrinsic" as --inherent--.

Signed and Sealed this

Second Day of February, 1988

*Attest:*

DONALD J. QUIGG

*Attesting Officer*  *Commissioner of Patents and Trademarks*